(12) United States Patent
Kannoo

(10) Patent No.: US 8,820,356 B2
(45) Date of Patent: Sep. 2, 2014

(54) MULTI-WAY REVERSING VALVE

(75) Inventor: Takeshi Kannoo, Tokyo (JP)

(73) Assignee: Fujikoki Corporation (JP)

( * ) Notice: Subject to any disclaimer, the term of this patent is extended or adjusted under 35 U.S.C. 154(b) by 599 days.

(21) Appl. No.: 13/077,150

(22) Filed: Mar. 31, 2011

(65) Prior Publication Data

US 2011/0240160 A1 Oct. 6, 2011

(30) Foreign Application Priority Data

Apr. 5, 2010 (JP) ................................. 2010-086647

(51) Int. Cl.
*F16K 11/07* (2006.01)

(52) U.S. Cl.
USPC ................................................... 137/625.43

(58) Field of Classification Search
USPC ............................ 137/625.43, 625.46, 625.47
See application file for complete search history.

(56) References Cited

U.S. PATENT DOCUMENTS

| | | | |
|---|---|---|---|
| 4,139,355 A * | 2/1979 | Turner et al. | 62/324.6 |
| 5,787,929 A | 8/1998 | Iwata | |
| 6,076,365 A * | 6/2000 | Benatav | 62/160 |
| 6,234,207 B1 * | 5/2001 | Toyama | 137/625.43 |
| 6,491,063 B1 * | 12/2002 | Benatav | 137/625.43 |
| 6,880,802 B2 | 4/2005 | Hara et al. | |
| 7,631,661 B2 * | 12/2009 | Moreno | 137/625.43 |
| 2010/0108925 A1 | 5/2010 | Kannoo et al. | |

FOREIGN PATENT DOCUMENTS

| | | |
|---|---|---|
| JP | 06-221723 A | 12/1994 |
| JP | 2001-056060 A | 2/2001 |
| JP | 2001-317839 A | 11/2001 |
| JP | 2004-156771 A | 6/2004 |
| JP | 2011-149474 | 8/2011 |

* cited by examiner

*Primary Examiner* — John Fox
(74) *Attorney, Agent, or Firm* — McCarter & English

(57) ABSTRACT

A multi-way reversing valve includes a valve housing having a valve seat part in which a plurality of fluid in/out ports are formed; a valve member adapted to be rotated; and an actuator adapted to rotationally actuate the valve member. A fluid inlet port and/or a fluid outlet port is/are formed in the valve housing. A passage adapted to selectively place the fluid inlet port or the fluid outlet port in communication with the plurality of fluid in/out ports is formed within the valve member. Flow paths are reversed by rotating the valve member to selectively place the fluid inlet port or the fluid outlet port in communication with one of the plurality of in/out ports via the passage. The rotational axis line of the valve member is laterally eccentric relative to the rotational axis line of an output shaft of the actuator by a predetermined distance.

13 Claims, 4 Drawing Sheets

MULTI-WAY REVERSING VALVE

CROSS-REFERENCE TO RELATED APPLICATIONS

This application claims priority to Japanese Patent Application No. 2010-086647, filed Apr. 5, 2010, all of which is herein incorporated by reference in its entirety.

FIELD OF THE INVENTION

The present disclosure relates to multi-way reversing valves, such as three-way reversing valves, four-way reversing valves, etc., used in refrigeration cycles (e.g., heat pumps) or the like, and, more particularly, to rotary multi-way reversing valves that reverse flow paths by rotating a valve member by means of an actuator, such as a motor, etc.

BACKGROUND OF THE INVENTION

The assignee of the present application has previously proposed a multi-way reversing valve as that shown in FIG. 4 (see, for example, Patent Documents 1 and 2 mentioned below, the entire contents of each being herein incorporated by reference in their entirety). The illustrated multi-way reversing valve is briefly described below. It is noted that while a first fluid in/out port 12 and a second fluid in/out port 13 are drawn on the left and right of central axis O in FIG. 4 for easier comprehension, they are also provided in the layout shown in FIGS. 5A and 5B.

Multi-way reversing valve 10' in the illustrated example is a rotary four-way reversing valve for use in a heat pump device. The multi-way reversing valve 10' comprises a high-pressure fluid inlet port 11, the first fluid in/out port 12, the second fluid in/out port 13, and a low-pressure fluid outlet port 14, and a refrigerant is generally used for the fluid. The multi-way reversing valve 10' includes a stepping motor 15 as a flow-path reversing actuator having a rotor 16 disposed on the inner-circumference side of a can 18 and a stator 17 that is externally fitted and fixed on the outer circumference of the can 18; a valve member 50 that is rotated by the stepping motor 15; and a valve housing 60 that rotatably holds this valve member 50.

It is noted that a planetary gear reduction system 40 is installed within the motor 15, and the rotation of the output shaft of the motor 15 (an output shaft 45 of the planetary gear reduction system 40) is transmitted directly to the valve member 50.

The valve housing 60 includes an upper box-like body (upper segment) 60A and a lower lid-like body (lower segment) 60B which are fastened in an airtight manner by means of three bolts 93. The upper box-like body 60A and the lower lid-like body 60B define a cylindrical valve chamber 61.

The upper box-like body 60A includes an upper base part 60a of a generally protruding shape, and a cylindrical wall part 60b that protrudes downward from the outer circumferential part of the lower surface of the upper base part 60a and that mainly defines a circumferential wall part of the valve chamber 61. The first fluid in/out port 12 and the second fluid in/out port 13, each having an inverted L-shaped section and comprising a horizontal hole and a vertical hole, are provided on the left and right of the upper base part 60a. Further, the low-pressure fluid outlet port 14 leading to the valve chamber 61 is provided on the front side of the upper part of the cylindrical wall part 60b.

On the other hand, the lower lid-like body 60B is arranged in the shape of a thick plate with a ledge and onto which the lower end part of the cylindrical wall part 60b is fitted. In the center thereof (along rotational axis line O) is provided the high-pressure fluid inlet port 11 which penetrates therethrough and opens into the valve chamber 61. It is noted that in order to reduce weight and so forth, aluminum is typically used for the material of the valve housing 60 (i.e., the upper box-like body 60A and the lower lid-like body 60B).

A valve seat member 65 is provided (screwed) at the ceiling part of the valve chamber 61. The respective lower end openings of the first fluid in/out port 12 and the second fluid in/out port 13 are formed in the valve seat member 65.

The valve member 50 includes a valve shaft member 50A made of stainless steel (SUS) comprising, in order from the top, a small-diameter shaft part 51 that is coupled with, in an integrally rotatable manner, the output shaft 45 of the planetary gear reduction system 40 within the motor 15, a center shaft part 52 inserted into a center hole 67 formed in the upper box-like body 60A and into an opening 69 formed in the center of the valve seat member 65, and a large-diameter cylindrical shaft part 53 inserted into the high-pressure fluid inlet port 11; and an off-axis member 54 that is externally fitted and fixed onto a ledge part of the valve shaft member 50A, the ledge part spanning from the lower end part of the center shaft part 52 located within the valve chamber 61 down to the upper end of a center thick-walled part 53a of the large-diameter cylindrical shaft part 53. The parts of the valve member 50 located within the valve chamber 61 (i.e., the lower part of the center shaft part 52, the large-diameter cylindrical shaft part 53, and the off-axis member 54) form a crank-shaped or inverted L-shaped reversing valve member part 50B.

The center shaft part 52 and the lower end part of the large-diameter cylindrical shaft part 53 of the valve shaft member 50A are respectively supported by sleeve-like shaft bearing members 81 and 82 in a slidable and rotatable fashion. Further, a Teflon (registered trademark) lip seal 83 is installed between the lower tapered surface part of the center thick-walled part 53a of the large-diameter cylindrical shaft part 53 and the inner circumferential surface of the high-pressure fluid inlet port 11.

A valve member internal passage 55 is provided within the reversing valve member part 50B, the valve member internal passage 55 being of a crank-shape or an inverted L-shape similar thereto.

At the exit-side end part of this valve member internal passage 55, an O-ring 74 and a square ring 75 as seal members are mounted so as to be in pressured contact with the valve seat member 65 in an airtight manner. The O-ring 74 is pressured radially outward by the high-pressure fluid flowing through the valve member internal passage 55, and its cross-section changes from circular to elliptical. Utilizing this change in shape of the O-ring 74, one end surface of the square ring 75 is pressed against the valve seat member 65 to attain a sealing effect.

It is noted that, in order to press the exit-side end part of the valve member internal passage 55 (i.e., the square ring 75) against the valve seat member 65, a coil spring 92 that biases the valve member 50 upward is compressed and loaded around the outer circumference of a cylindrical protruding wall part 60d that is provided in a protruding manner at the center part of the upper surface of the lower lid-like body 60B. In addition, in order to prevent any unwanted fluid leakage, a seal member, such as an O-ring 95, etc., is mounted at key points, such as at interfaces between the various members, etc., for example, between the lower inner circumferential surface of the cylindrical wall part 60b of the upper box-like body 60A and the upper outer circumferential surface of the lower lid-like body 60B.

With the multi-way reversing valve (four-way reversing valve) 10' having the configuration above, as the valve member 50 is rotated by the motor 15, and the exit-side end part of the valve member internal passage 55 (i.e., the square ring 75) arrives at the position directly below (the lower end of) the first fluid in/out port 12 of the valve seat member 65 (i.e., the state shown in FIG. 5B), the high-pressure fluid inlet port 11 and the first fluid in/out port 12 are placed in communication with each other via the valve member internal passage 55. Thus, the high-temperature high-pressure fluid flows towards the first fluid in/out port 12 via the valve member internal passage 55, while the low-temperature low-pressure fluid from the second fluid in/out port 13 flows towards the low-pressure fluid outlet port 14 via the valve chamber 61.

Conversely, as the exit-side end part of the valve member internal passage 55 (i.e., the square ring 75) is rotated to the position directly below (the lower end of) the second fluid in/out port 13 of the valve seat member 65 (i.e., the state shown in FIG. 5A), the high-pressure fluid inlet port 11 and the second fluid in/out port 13 are placed in communication with each other via the valve member internal passage 55. Thus, the high-temperature high-pressure fluid flows towards the second fluid in/out port 13 via the valve member internal passage 55, while the low-temperature low-pressure fluid from the first fluid in/out port 12 flows towards the low-pressure fluid outlet port 14 via the valve chamber 61.

Thus, the multi-way reversing valve 10' in the illustrated example reverses flow paths by rotating the valve member 50 to selectively place either the first fluid in/out port 12 or the second fluid in/out port 13 in communication with either the high-pressure fluid inlet port 11 or the low-pressure fluid outlet port 14 via the valve member internal passage 55 and the valve chamber 61. See, e.g., Patent Document 1 (JP Patent Application No. 2010-010309) and Patent Document 2 (JP Patent Application No. 2009-203926).

SUMMARY OF THE INVENTION

The rotary four-way reversing valve shown in FIG. 4 is such that the high-pressure fluid inlet port 11 is positioned along the rotational axis line of the valve member and the actuator that actuates the valve member is also positioned along the same rotational axis line. In addition, the first fluid in/out port 12, the second fluid in/out port 13 and the low-pressure fluid outlet port 14 extend from the valve housing of the multi-way reversing valve in a direction perpendicular to the rotational axis of the valve member.

However, depending on the actual piping layout of the refrigeration cycle in which the multi-way reversing valve is to be placed, there may be cases where it would be desirable to have, for example, the first fluid in/out port 12, the second fluid in/out port 13 and the low-pressure fluid outlet port 14 extend in the opposite direction to that of the high-pressure fluid inlet port 11 (that is, to provide, for example, the various ports 12, 13 and 14 on the side on which the actuator is located, and to have their central axes be parallel to the port 11).

In trying to form the ports adjacent to the actuator in the manner above, as should be apparent from FIG. 4, the valve housing 60 would inevitably have to be configured with a greater diameter, which raises concerns for an increase in size of the multi-way reversing valve.

In addition, the rotary four-way reversing valve 10' mentioned above is such that the rotation of the output shaft of the motor 15 (the output shaft 45 of the planetary gear reduction system 40) is transmitted directly to the valve member 50, the rotational axis line of the output shaft 45 of the motor 15 and the rotational axis line of the valve member 50 are in alignment (both being rotational axis line O), and, further, the fluid inlet port 11 is located along this rotational axis line O. Thus, in order to reverse flow paths, it was required that (the diameter of) the valve seat member 65 be made large (e.g., almost twice the radius of rotation of the reversing valve member part 50B) and, further, an unnecessary space (i.e., the part indicated with the letter S in FIGS. 5A and 5B) was created in the valve chamber 61 (the valve seat member 65) on the side opposite the side on which the fluid in/out ports 12 and 13 are located (opened), consequently resulting in a problem where the reversing valve 10' becomes relatively large.

Further, there is a problem in that, with the structure above, the fluid inlet port 11 has to be positioned along rotational axis line O of the actuator, and layout freedom with respect to the various ports 11, 12, 13, 14, etc., is limited.

The present invention is made in view of the circumstances above, and one object thereof is to provide a multi-way reversing valve that allows for a reduction in size, an improvement in layout freedom, a reduction in assembly processing costs, etc.

In order to accomplish the object mentioned above, a multi-way reversing valve according to an embodiment of the present disclosure basically includes a valve housing in which a valve chamber and at least three ports that lead to the valve chamber are provided; a valve member rotatably provided in the valve chamber so as to selectively place one of the ports in communication with one of the remaining plurality of ports; and an actuator adapted to rotate the valve member, wherein a rotational axis line of the valve member is laterally eccentric relative to a rotational axis line of an output shaft of the actuator by a predetermined distance.

Another multi-way reversing valve includes a valve housing having a valve seat part in which a plurality of fluid in/out ports are formed; a valve member adapted to be rotated in contact with the valve seat part; and an actuator adapted to rotationally actuate the valve member, wherein a fluid inlet port and/or a fluid outlet port is/are formed in the valve housing, a passage part adapted to selectively place the fluid inlet port or the fluid output port in communication with the plurality of fluid in/out ports is formed within the valve member, flow paths are reversed by rotating the valve member by means of the actuator to selectively place the fluid inlet port or the fluid outlet port in communication with one of the plurality of in/out ports via the passage part within the valve member, and a rotational axis line of the valve member is laterally eccentric relative to a rotational axis line of an output shaft of the actuator by a predetermined distance.

Yet another multi-way reversing valve includes a valve housing in which a fluid inlet port is provided on one side and a valve seat part is provided on another side, the valve seat part having a plurality of fluid ports formed therein; a valve member adapted to be rotated in contact with the valve seat part; and an actuator adapted to rotationally actuate the valve member, wherein a passage part adapted to selectively place the fluid inlet port in communication with the plurality of fluid ports is formed within the valve member, flow paths are reversed by rotating the valve member by means of the actuator to selectively place the fluid inlet port in communication with one of the plurality of fluid ports via the passage part within the valve member, and a rotational axis line of the valve member is laterally eccentric relative to a rotational axis line of an output shaft of the actuator by a predetermined distance.

In a more specific embodiment, a multi-way reversing valve includes a valve housing in which a fluid inlet port is provided on one side and a valve seat part is provided on another side, the valve seat part having a fluid outlet port and two fluid in/out ports formed therein; a valve member adapted to be rotated in contact with the valve seat part, and an actuator adapted to rotationally actuate the valve member, wherein a passage part adapted to selectively place the fluid inlet port in communication with the plurality of fluid in/out ports is formed within the valve member, flow paths are reversed by rotating the valve member by means of the actuator to selectively place the fluid inlet port in communication with one of the plurality of fluid in/out ports via the passage part within the valve member, and a rotational axis line of the valve member is laterally eccentric relative to a rotational axis line of an output shaft of the actuator by a predetermined distance.

In one preferred embodiment, the actuator is attached to the valve housing on the side on which the fluid inlet port is provided.

In another preferred embodiment, a high-pressure fluid inlet port is provided as the fluid inlet port.

In another preferred embodiment, the rotational actuating force of the actuator is transmitted to the valve member via a gear train.

In another preferred embodiment, the gear train is provided within the valve chamber.

The last stage of the gear train is preferably a spur gear provided on the outer circumference of the valve member.

With a multi-way reversing valve according to an embodiment of the present invention, the rotational axis line of the valve member is arranged to be laterally eccentric relative to rotational axis line O of the output shaft of the actuator by a predetermined distance. Thus, unnecessary space is eliminated, making it possible to reduce the size of the multi-way reversing valve, while allowing for improved layout freedom, reduced assembly processing costs, etc.

In a preferred embodiment, by having the fluid inlet port, which is formed along the rotational axis of the valve member, attached adjacent to the actuator and arranging it to be an inlet port for a high-pressure refrigerant discharged from a compressor, since the inlet port is smaller in diameter as compared to the other ports, it is possible to further reduce the size of the multi-way reversing valve.

In a preferred embodiment, since the rotational actuating force of the actuator is transmitted to the valve member via the gear train, by setting appropriate gear ratios, it is possible to adjust the torque and rotational speed of the actuator.

In addition, since the gear train is provided within the valve chamber, it is possible to realize a housing structure for it through a simple configuration as compared to cases where an actuating force transmission mechanism is provided anew outside of the valve chamber.

Further, by attaching or forming a spur gear on the outer circumference of the valve member, it is possible to further simplify the configuration of the actuating force transmission mechanism.

DETAILED DESCRIPTION OF THE INVENTION

Embodiments of multi-way reversing valves according to the present invention are described below with reference to the drawings.

Figure 1:
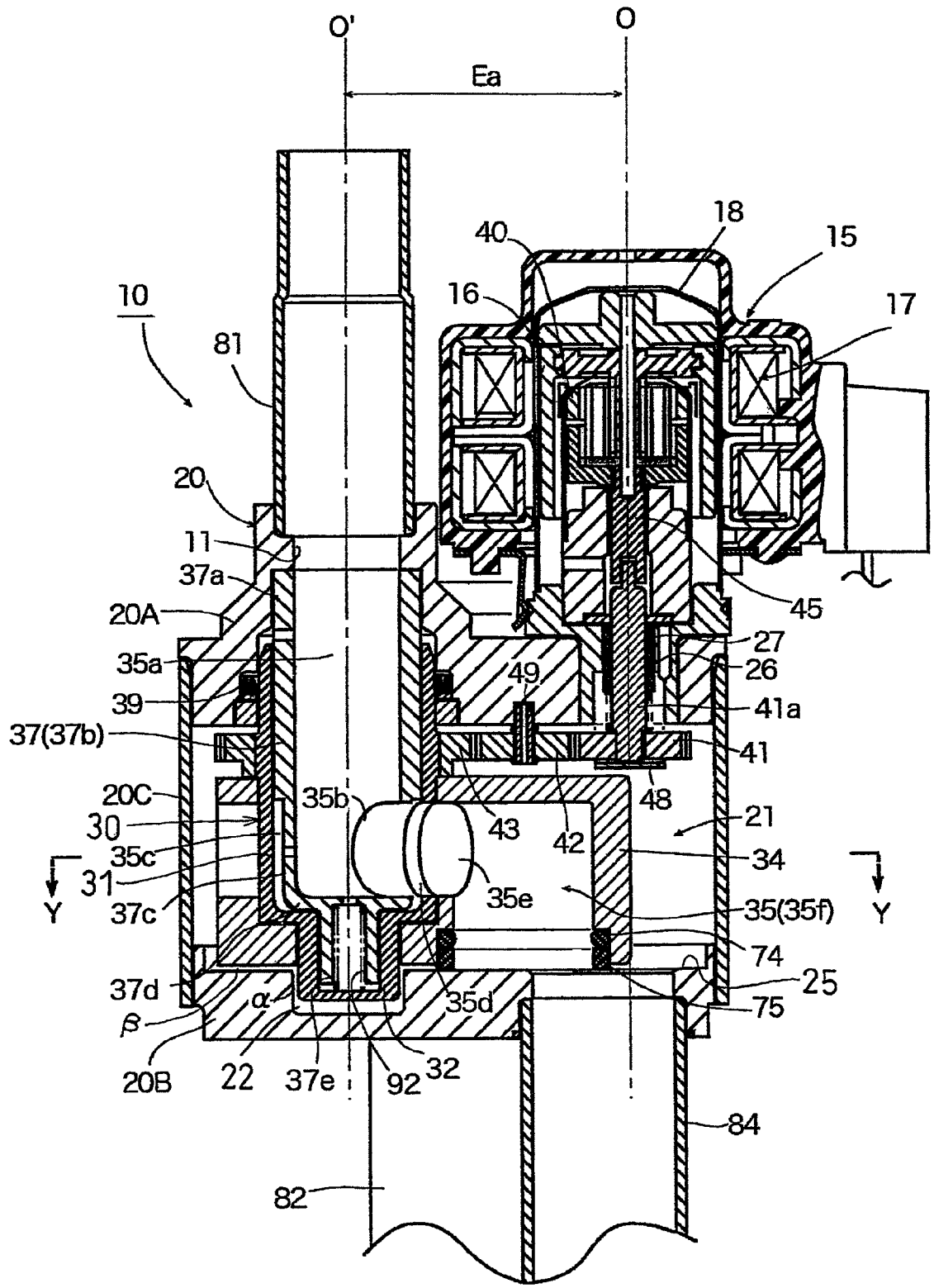
FIG. 1 is a vertical sectional view showing one embodiment of a multi-way reversing valve according to the present disclosure.
Figure 2:
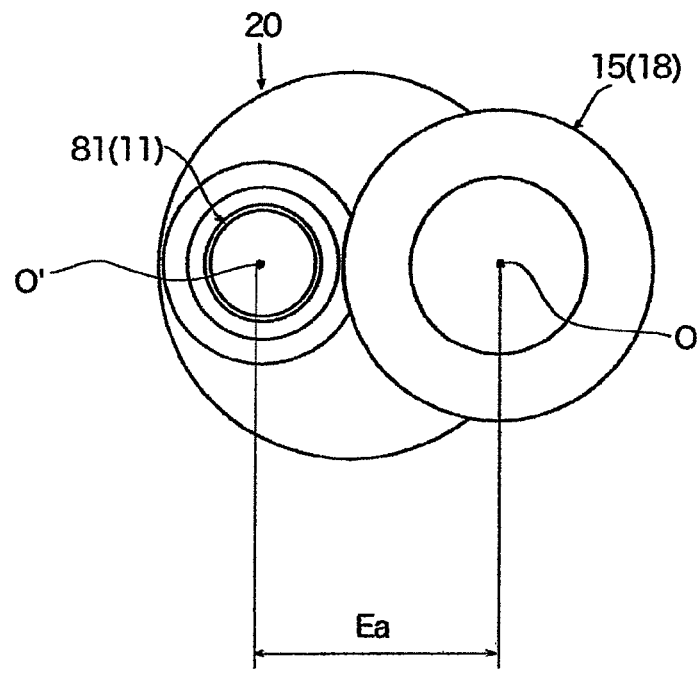
FIG. 2 is a plan view of the multi-way reversing valve shown in FIG. 1.
Figure 3:
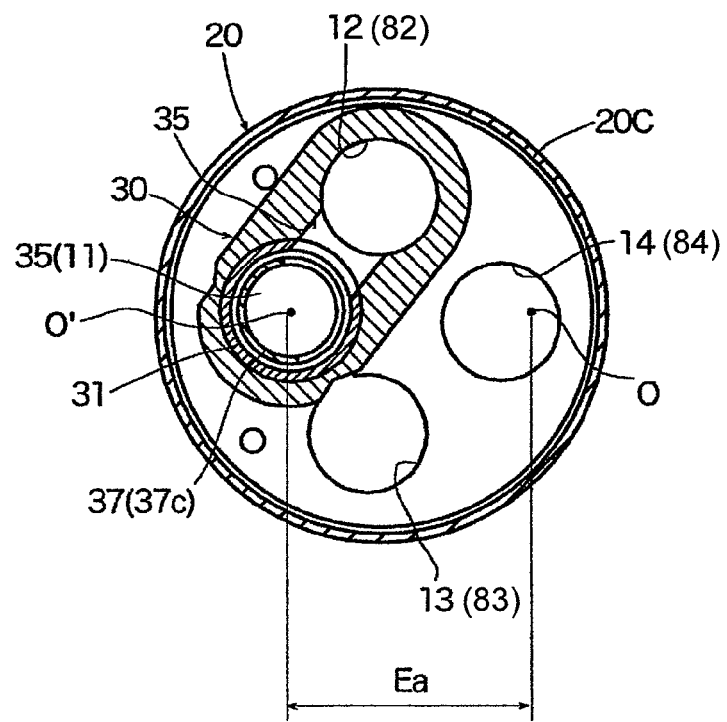
FIG. 3 is a sectional view as viewed in the direction of the Y-Y arrows in FIG. 1.

FIG. 1 is a vertical sectional view showing one embodiment of a multi-way reversing valve according to the present disclosure. FIG. 2 is a plan view of the multi-way reversing valve shown in FIG. 1. FIG. 3 is a sectional view as viewed in the direction of the Y-Y arrows in FIG. 1. In each of these views, like parts corresponding to those of the multi-way reversing valve 10' in FIGS. 4, 5A and 5B discussed above are designated with like reference numerals while providing brief descriptions therefor.

Figure 4:
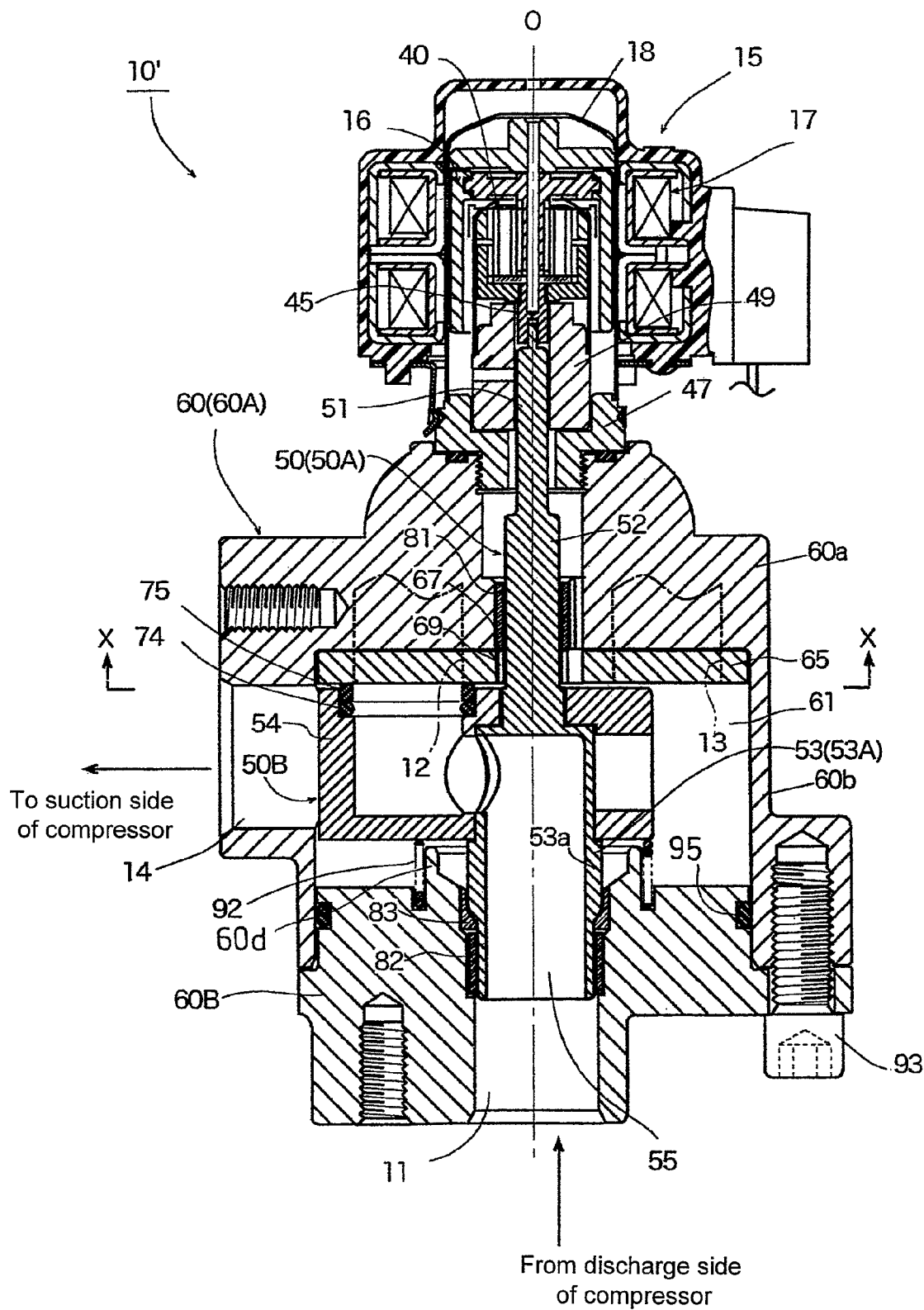
FIG. 4 is a vertical sectional view showing one example of a previously proposed multi-way reversing valve.
Figure 5A:
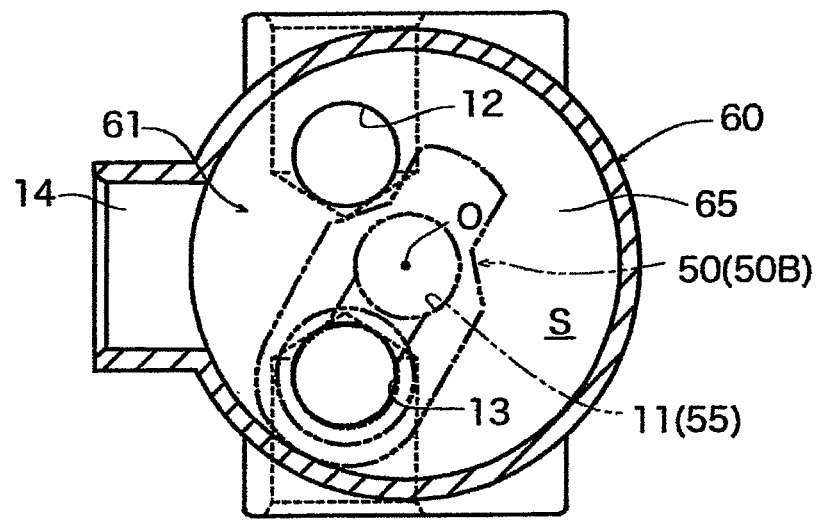
FIGS. 5A and 5B are sectional views as viewed in the direction of the X-X arrows in FIG. 4.
Figure 5B:
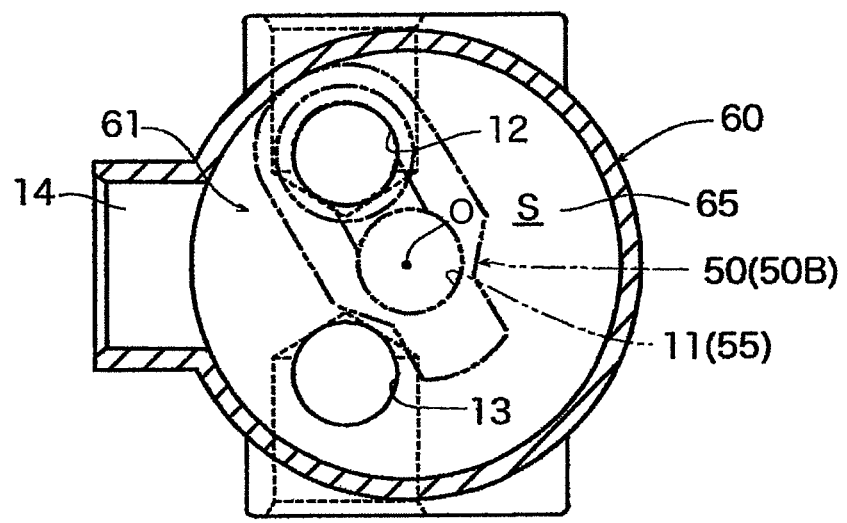

The multi-way reversing valve 10 in the illustrated example, as in the multi-way reversing valve 10' shown in FIGS. 4, 5A and 5B, is also a rotary four-way reversing valve for use in heat pump devices, the multi-way reversing valve 10 comprising the high-pressure fluid inlet port 11, the first fluid in/out port 12, the second fluid in/out port 13, and the low-pressure fluid outlet port 14. The multi-way reversing valve 10 typically uses a refrigerant for the fluid and includes the stepping motor 15 as a flow path reversing actuator; a valve member 30 adapted to be rotated by the stepping motor 15; and a valve housing 20 that rotatably holds this valve member 30. Rotational axis line O' of the valve member 30 and rotational axis line O of the output shaft 45 of the motor 15 are both eccentrically positioned with respect to the central axis of the valve housing 20 (i.e., a line perpendicular to the sheet and passing through the center of the circle indicated with the reference numeral 20C in FIG. 3). In addition, rotational axis line O' of the valve member 30 is laterally eccentric relative to rotational axis line O of the output shaft 45 of the motor 15 by predetermined distance Ea. The planetary gear reduction system 40 is installed within the motor 15, and the rotation of the output shaft 45 of the motor 15 (the output shaft of the planetary gear reduction system 40) is transmitted to the valve member 30 via a train of spur gears 41, 42 and 43 (later described). By way of this gear train, the rotation of the output shaft of the planetary gear reduction system 40 is further decelerated and transmitted to the valve member 30.

The valve housing 20 comprises an upper body 20A, a bottom lid-like body (lower body) 20B, and a cylindrical body 20C whose end parts are welded so as to connect the upper body 20A and the bottom lid-like body 20B. The upper body 20A, the lid-like body 20B, and the cylindrical body 20C define a cylindrical valve chamber 21.

A vertical hole 26 is provided in the upper body 20A on one side (the right side in FIG. 1). A shaft part 41a of the first spur gear 41 that is connected with the output shaft 45 in an integrally rotatable manner is rotatably supported by a sleeve-like shaft bearing member 27 mounted in this vertical hole 26. The first spur gear 41 meshes with the second spur gear 42 that is supported by a spring pin 49 that is mounted and fixed on the upper body 20A. The second spur gear 42 meshes with the third spur gear 43 provided on the outer circumference of the valve member 30.

Further, the upper surface of the bottom lid-like body 20B of the valve housing 20 on one side serves as a valve seat part 25, and the first fluid in/out port 12, the second fluid in/out port 13, and the low-pressure fluid outlet port 14 are provided therein at intervals of 90 degrees. On the other hand, the high-pressure fluid inlet port 11 is provided in the upper body 20A on the other side (the left side in FIG. 1). Pipes (e.g., joints) 81, 82, 83 and 84 are coupled with the ports 11, 12, 13 and 14, respectively.

An upper end part 37a of a shaft bearing member 37 of a cylindrical shape with a base is fixed by press fitting, crimping, etc., on the lower side of the high-pressure fluid inlet port 11 in the upper body 20A. Consequently, the shaft bearing member 37 is supported on one side by the valve housing 20. Slightly more than the upper half of this cylindrical shaft bearing member 37, excluding its upper end part 37a, is arranged as a shaft bearing part 37b of a large diameter, and from the lower end of this shaft bearing part 37b to a base part 37d is a small-diameter part 37c. A spring guide 37e protruding downward is provided on the base part 37d, and a hole is formed in a key part thereof.

On the other hand, the valve member 30 includes a cylindrical shaft part 31 with a base and having a downward protruding part 32, and an off-axis member 34 that is externally fitted and fixed on the lower half of the cylindrical shaft part 31 (i.e., the part located within the valve chamber 21). Its external form as viewed from the side is of an L-shape or a crank-shape, and thereinside is provided a valve member internal passage 35 whose shape is generally similar to the external form of the valve member 30. This valve member 30 is supported on one side by the valve housing 20 via the cylindrical shaft bearing member 37. Specifically, the upper half part of the cylindrical shaft part 31 of the valve member 30 is externally fitted in a rotatable manner on the outer circumference of the shaft bearing member 37 provided in the upper body 20A. The downward protruding part 32 of the cylindrical shaft part 31 is rotatably supported on the outer circumference of the spring guide 37e of the cylindrical shaft bearing member 37. A recessed part 22 is provided in the bottom-lid like body 20B. The downward protruding part 32 provided at the lower end part of the valve member 30 is disposed within the recessed part 22. Predetermined gap a is formed between the inner circumferential surface of the recessed part 22 and the outer circumferential surface of the downward protruding part 32. Further, gap β is also formed between the bottom surface of the off-axis member 34 and the valve seat part 25. Gaps α and β are so defined that the downward protruding part 32 and the recessed part 22, or the lower surface of the off-axis member 34 and the valve seat part 25, would not come into contact with each other even if distortion were to occur in the valve housing 20 upon welding the cylindrical body 20C to the upper body 20A and the bottom lid-like body 20B.

The valve member internal passage 35 includes an internal part 35a of the cylindrical shaft bearing member 37, an opening 35b formed in the shaft bearing member 37, a gap 35c formed between the small-diameter part 37c and the cylindrical shaft part 31 of the valve member 30, an opening 35d formed in the cylindrical shaft part 31, and an opening 35e formed in the off-axis member 34.

In order to prevent fluid leakage from the valve member internal passage 35 into the valve chamber 21, the O-ring 74 and the square ring 75 as seal members are mounted, in such a manner as to be in airtight and pressured contact with the valve seat part 25, on the end part of the valve member 30 on the side that is not supported, that is, the exit-side end part of the valve member internal passage 35. The O-ring 74 is pressured radially outward by the high-pressure fluid flowing through the valve member internal passage 35, and its cross-section changes from circular to elliptical. Utilizing this change in shape of the O-ring 74, one end surface of the square ring 75 is pressed against the valve seat part 25 to attain a sealing effect.

Further, in order to press the exit-side end part of the valve member internal passage 35 (i.e., the square ring 75) against the valve seat part 25, the coil spring 92 that biases the valve member 30 downward is compressed and loaded between the base part 37d of the cylindrical shaft bearing member 37 and the base part of the downward protruding part 32 of the valve member 30 (within the spring guide 37e).

With the multi-way reversing valve (four-way reversing valve) 10 of the configuration above, the rotary drive force of the motor 15 is transmitted to the valve member 30 via the planetary gear reduction system 40 and the gear train comprising the first spur gear 41, the second spur gear 42 and the third spur gear 43. As the valve member 30 is thus rotated, and the exit-side end part of the valve member internal passage 35 (i.e., the square ring 75) is positioned right above the first fluid in/out port 12 of the valve seat part 25 (FIG. 3), the high-pressure fluid inlet port 11 and the first fluid in/out port 12 are placed in communication with each other via the valve member internal passage 35. The high-temperature high-pressure fluid flows to the first fluid in/out port 12 via the valve member internal passage 35, while the low-temperature low-pressure fluid from the second fluid in/out port 13 flows to the low-pressure fluid outlet port 14 via the valve chamber 21.

Conversely, as the exit-side end part of the valve member internal passage 35 (i.e., the square ring 75) is rotated to the position right above the second fluid in/out port 13 of the valve seat part 25, the high-pressure fluid inlet port 11 and the second fluid in/out port 13 are placed in communication with each other via the valve member internal passage 35. The high-temperature high-pressure fluid flows to the second fluid in/out port 13 via the valve member internal passage 35, while the low-temperature low-pressure fluid from the first fluid in/out port 12 flows to the low-pressure fluid outlet port 14 via the valve chamber 21.

The multi-way reversing valve 10 of the present embodiment thus reverses flow paths by rotating the valve member 30 to selectively place either the first fluid in/out port 12 or the second fluid in/out port 13 in communication with either the high-pressure fluid inlet port 11 or the low-pressure fluid outlet port 14 via the valve member internal passage 35 and the valve chamber 21.

With respect to the thus configured multi-way reversing valve 10 of the present embodiment, the valve member 30 is externally fitted on the cylindrical shaft bearing member 37 supported by the upper body 20A on one side, and the valve member 30 is supported by the valve housing 20 on one side via the cylindrical shaft bearing member 37. Thus, problems in the reversing operation of the valve member 30 can be prevented even when distortion (e.g., misalignment of the axial center with respect to the central axis of the multi-way reversing valve 10) occurs between the upper body 20A and the bottom lid-like body 20B due to welding at the time of assembly of the valve housing 20.

Further, since the valve member 30 is configured to be of a structure that is supported on one side, there is no need to provide shaft bearings for the valve member in both the upper body 20A and the lower body 20B that form the valve housing 20, and how coaxial the two shaft bearings are when the valve housing 20 is assembled need not be considered. Thus, there is no need to provide the shaft bearing at the central axis position of the valve housing 20, the valve member 30 can be disposed at a position that is away from (eccentric with respect to) the central axis position, and layout freedom for the flow paths to be provided in the multi-way reversing valve increases. In addition, the multi-way reversing valve can thus be made smaller, while assembly processing costs can also be reduced, and so forth.

Further, since the actuator that actuates the valve member is also disposed at a position that is away from (eccentric with respect to) the central axis position of the valve housing, layout freedom for the flow paths to be provided in the multi-way reversing valve further increases, thereby making it possible to make the multi-way reversing valve smaller, as well as to reduce assembly processing costs, and so forth.

In addition, since rotational axis line O' of the valve member 30 that is provided with the fluid inlet port 11 is laterally eccentric relative to rotational axis line O of the output shaft 45 of the motor 15 by predetermined distance Ea, it becomes no longer necessary to secure, unlike the multi-way reversing valve 10' shown in FIGS. 4, 5A and 5B, for (the diameter of) the valve seat part 25 nearly twice as much as the radius of rotation of the valve member 30. Thus, it is possible to make it more compact, improve layout freedom, reduce assembly processing costs, and so forth.

In the foregoing description, as shown in FIG. 1, the recessed part 22 is provided in the bottom lid-like body 20B and the lower end part (the downward protruding part 32) of the valve member 30 is disposed within the recessed part 22. This configuration allows for the height-direction dimension of the multi-way reversing valve to be shortened. However, it is naturally possible to configure the multi-way reversing valve without providing the recessed part 22 in the bottom lid-like body 20B, that is, by having the bottom surface of the downward protruding part 32 and the bottom surface of the off-axis member 34 be generally flush with each other.

In addition, in the foregoing description, as shown in FIG. 1, the cylindrical shaft bearing member 37 is supported by the valve housing 20 on one side and the valve member 30 is supported at both ends by the cylindrical shaft bearing member 37. Through such a configuration, the valve member 30 is firmly supported with respect to the cylindrical shaft bearing member 37. However, it is by no means limited to such a configuration. By way of example, instead of employing the sliding contact structure for the spring guide 37e of the cylindrical shaft bearing member 37 and the inner wall of the downward protruding part 32 of the valve member 30, the valve member 30 may be configured in a cantilever structure in which only its upper body 20A-side is supported with respect to the cylindrical shaft bearing member 37. Further, the upper side part of the valve member 30 (the cylindrical shaft part 31) may be inserted into the shaft bearing provided in the upper body 20A without providing the cylindrical shaft bearing member 37, and the valve member 30 may be directly supported on one side by the valve housing 20.

In addition, although a description has been provided on the assumption that the rotation of the output shaft of the planetary gear reduction system 40 is transmitted to the valve member 30 after being further decelerated by the train of spur gears (e.g., external gears) 41, 42 and 43, the reduction ratio thereof may be set as deemed appropriate depending on the purpose of the multi-way reversing valve. In addition, the rotation of the output shaft of the planetary gear reduction system 40 may also be transmitted to the valve member 30 unchanged without any deceleration (i.e., the revolution rate of the output shaft may be equal to that of the valve member 30). Further, it follows that the rotating shaft of the stepping motor 15 (the rotating shaft of the rotor 16) may be directly coupled with one end of the gear train (the gear 41) without using the planetary gear reduction system 40.

Further, in the foregoing description, as shown in FIG. 1, the valve housing 20 is configured by welding the upper body 20A, the bottom lid-like body 20B and the cylindrical body 20C. However, it is by no means limited as such, and the cylindrical body 20C may be integrally configured (e.g., molded in one piece) with the upper body 20A or the bottom lid-like body 20B, and an end part of the cylindrical body may be welded to either the bottom lid-like body 20B or the upper body 20A. In addition, the valve housing may be of any other configuration as well.

Further, it follows that the present invention is applicable not only to a configuration in which the valve member is supported on one side with respect to the valve housing, but also to one where both sides are supported. Similarly, the valve housing need not necessarily be configured by welding, and may instead be coupled using such fastening means as seal members and screws, etc.

Further, although the actuator (the stepping motor 15) of the multi-way reversing valve is disposed within the range of motion of the valve member 30 as is apparent from FIGS. 1 through 3, the present invention is by no means limited as such. Taking the layout of the multi-way reversing valve into consideration, it may be disposed at any position outside of the above-mentioned range of motion.

Further, the low-pressure fluid outlet port 14 may be provided in the side surface of the valve housing 20.

Further, although it is described above that two fluid in/out ports are provided, this may be made three or more, thus adopting a configuration in which the high-pressure fluid inlet port is selectively placed in communication with each of the in/out ports by rotating the valve member 30.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

DESCRIPTION OF FIGURE ELEMENTS

10 Multi-way reversing valve (four-way reversing valve)
11 High-pressure fluid inlet port
12 First fluid in/out port
13 Second fluid in/out port
14 Low-pressure fluid outlet port
15 Motor (actuator)
20 Valve housing
20A Upper body
20B Bottom lid-like body
20C Cylindrical body
30 Valve member
35 Valve member internal passage
37 Cylindrical shaft bearing member
40 Planetary gear reduction system
41, 42, 43 Spur gear (external gear)

What is claimed is:

1. A multi-way reversing valve, comprising:
   a valve housing in which a valve chamber and at least three ports that lead to the valve chamber are provided;
   a valve member rotatably provided in the valve chamber so as to selectively place one of the ports in communication with one of the remaining plurality of ports;
   an actuator adapted to rotate the valve member; and
   a cylindrical shaft bearing member;
   wherein the valve member is supported on one side by the valve housing;
   wherein a rotational axis line of the valve member is laterally eccentric relative to a rotational axis line of an output shaft of the actuator by a predetermined distance; and
   wherein the cylindrical shaft bearing member is supported on one side by the valve housing and one end part or both end parts of the valve member is/are slidably and rotatably fitted around the outer circumference of the cylindrical shaft bearing member.

2. The multi-way reversing valve according to claim 1, wherein the rotational actuating force of the actuator is transmitted to the valve member via a gear train.

3. The multi-way reversing valve according to claim 2, wherein the gear train is provided within the valve chamber.

4. The multi-way reversing valve according to claim 2, wherein the last stage of the gear train is a spur gear provided on the outer circumference of the valve member.

5. The multi-way reversing valve according to claim 1, wherein
   the valve housing comprises an upper body, a lower body, and a cylindrical body, wherein the cylindrical body is welded so as to connect the upper body and the lower body;
   an upper end part of the cylindrical shaft bearing member is fixed on the upper body and an upper half of the valve member is slidably and rotatably fitted around the outer circumference of the cylindrical shaft bearing member;
   a recessed part is provided in the lower body and a downward protruding part to be movably inserted into the recessed part is provided at the lower end of the valve member; and
   a predetermined gap is formed between the inner circumferential surface of the recessed part and the outer circumferential surface of the downward protruding part.

6. A multi-way reversing valve, comprising:
   a valve housing comprising a valve seat part in which a plurality of fluid in/out ports are formed;
   a valve member adapted to be rotated in contact with the valve seat part;
   an actuator adapted to rotationally actuate the valve member; and
   a cylindrical shaft bearing member;
   wherein a fluid inlet port and/or a fluid outlet port is/are formed in the valve housing;
   wherein a passage part adapted to selectively place the fluid inlet port or the fluid output port in communication with the plurality of fluid in/out ports is formed within the valve member;
   wherein flow paths are reversed by rotating the valve member by means of the actuator to selectively place the fluid inlet port or the fluid outlet port in communication with one of the plurality of in/out ports via the passage part within the valve member;
   wherein the valve member is supported on one side by the valve housing;
   wherein a rotational axis line of the valve member is laterally eccentric relative to a rotational axis line of an output shaft of the actuator by a predetermined distance; and
   wherein the cylindrical shaft bearing member is supported on one side by the valve housing and one end part or both end parts of the valve member is/are slidably and rotatably fitted around the outer circumference of the cylindrical shaft bearing member.

7. The multi-way reversing valve according to claim 6, wherein the actuator is attached to the valve housing on the side on which the fluid inlet port is provided.

8. The multi-way reversing valve according to claim 7, wherein a high-pressure fluid inlet port is provided as the fluid inlet port.

9. The multi-way reversing valve according to claim 6, wherein
   the valve housing comprises an upper body, a lower body, and a cylindrical body, wherein the cylindrical body is welded so as to connect the upper body and the lower body;
   an upper end part of a cylindrical shaft bearing member is fixed on the upper body and an upper half of the valve member is slidably and rotatably fitted around the outer circumference of the cylindrical shaft bearing member;
   a recessed part is provided in the lower body and a downward protruding part to be movably inserted into the recessed part is provided at the lower end of the valve member; and
   a predetermined gap is formed between the inner circumferential surface of the recessed part and the outer circumferential surface of the downward protruding part.

10. A multi-way reversing valve, comprising:
    a valve housing in which a fluid inlet port is provided on one side and a valve seat part is provided on another side, the valve seat part having a plurality of fluid ports formed therein;
    a valve member adapted to be rotated in contact with the valve seat part;
    an actuator adapted to rotationally actuate the valve member; and
    a cylindrical shaft bearing member;
    wherein a passage part adapted to selectively place the fluid inlet port in communication with the plurality of fluid ports is formed within the valve member;
    wherein flow paths are reversed by rotating the valve member by means of the actuator to selectively place the fluid inlet port in communication with one of the plurality of fluid ports via the passage part within the valve member;
    wherein the valve member is supported on one side by the valve housing;
    wherein a rotational axis line of the valve member is laterally eccentric relative to a rotational axis line of an output shaft of the actuator by a predetermined distance; and
    wherein the cylindrical shaft bearing member is supported on one side by the valve housing and one end part or both end parts of the valve member is/are slidably and rotatably fitted around the outer circumference of the cylindrical shaft bearing member.

11. The multi-way reversing valve according to claim 10, wherein
    the valve housing comprises an upper body, a lower body, and a cylindrical body, wherein the cylindrical body is welded so as to connect the upper body and the lower body;

an upper end part of a cylindrical shaft bearing member is fixed on the upper body and an upper half of the valve member is slidably and rotatably fitted around the outer circumference of the cylindrical shaft bearing member;

a recessed part is provided in the lower body and a downward protruding part to be movably inserted into the recessed part is provided at the lower end of the valve member; and a predetermined gap is formed between the inner circumferential surface of the recessed part and the outer circumferential surface of the downward protruding part.

12. A multi-way reversing valve, comprising:

a valve housing in which a fluid inlet port is provided on one side and a valve seat part is provided on another side, the valve seat part having a fluid outlet port and two fluid in/out ports formed therein;

a valve member adapted to be rotated in contact with the valve seat part;

an actuator adapted to rotationally actuate the valve member; and a cylindrical shaft bearing member;

wherein a passage part adapted to selectively place the fluid inlet port in communication with the plurality of fluid in/out ports is formed within the valve member;

wherein flow paths are reversed by rotating the valve member by means of the actuator to selectively place the fluid inlet port in communication with one of the plurality of fluid in/out ports via the passage part within the valve member;

wherein the valve member is supported on one side by the valve housing;

wherein a rotational axis line of the valve member is laterally eccentric relative to a rotational axis line of an output shaft of the actuator by a predetermined distance; and wherein the cylindrical shaft bearing member is supported on one side of the valve housing and one end part or both end parts of the valve member is/are slidably and rotatably fitted around the outer circumference of the cylindrical shaft bearing member.

13. The multi-way reversing valve according to claim 12, wherein the valve housing comprises an upper body, a lower body, and a cylindrical body, wherein the cylindrical body is welded so as to connect the upper body and the lower body;

an upper end part of a cylindrical shaft bearing member is fixed on the upper body and an upper half of the valve member is slidably and rotatably fitted around the outer circumference of the cylindrical shaft bearing member;

a recessed part is provided in the lower body and a downward protruding part to be movably inserted into the recessed part is provided at the lower end of the valve member, and a predetermined gap is formed between the inner circumferential surface of the recessed part and the outer circumferential surface of the downward protruding part.

* * * * *